(12) United States Patent
Liu et al.

(10) Patent No.: US 7,591,577 B2
(45) Date of Patent: Sep. 22, 2009

(54) LIGHT EMITTING DEVICE HAVING REFLECTIVE SURFACES EXTENDED FROM LIGHT INCIDENT SURFACES

(75) Inventors: Pang-Hsuan Liu, Longtan Shiang (TW); Mei-Fen Lin, Banqiao (TW)

(73) Assignee: Au Optronics Corp., Hsinchu (TW)

( * ) Notice: Subject to any disclaimer, the term of this patent is extended or adjusted under 35 U.S.C. 154(b) by 225 days.

(21) Appl. No.: 11/476,503

(22) Filed: Jun. 28, 2006

(65) Prior Publication Data

US 2007/0177070 A1 Aug. 2, 2007

(30) Foreign Application Priority Data

Jan. 27, 2006 (TW) ............................... 95103759 A

(51) Int. Cl.
*F21V 7/04* (2006.01)
(52) U.S. Cl. .................. 362/609; 362/613; 362/621
(58) Field of Classification Search .............. 362/615, 362/608, 609, 610, 612, 613, 621, 622
See application file for complete search history.

(56) References Cited

U.S. PATENT DOCUMENTS

| | | | | |
|---|---|---|---|---|
| 4,975,808 | A * | 12/1990 | Bond et al. | 362/609 |
| 5,377,083 | A * | 12/1994 | Tada | 362/613 |
| 6,193,383 | B1 * | 2/2001 | Onikiri et al. | 362/615 |
| 6,799,860 | B2 * | 10/2004 | Nakaoka et al. | 362/615 |
| 7,139,048 | B2 * | 11/2006 | Han et al. | 362/615 |
| 7,275,850 | B2 * | 10/2007 | Nesterenko et al. | 362/609 |
| 2006/0039166 | A1 * | 2/2006 | Blach | 362/613 |
| 2006/0181902 | A1 * | 8/2006 | Tamura et al. | 362/615 |

FOREIGN PATENT DOCUMENTS

| | | |
|---|---|---|
| CN | 1512233 | 7/2004 |
| JP | 2003-109419 | 4/2003 |

OTHER PUBLICATIONS

English language translation of abstract and pertinent part of JP 2003-109419.
English language translation of abstract and pertinent part of CN 1512233.

* cited by examiner

*Primary Examiner*—Alan Cariaso
(74) *Attorney, Agent, or Firm*—Thomas, Kayden, Horstemeyer & Risley

(57) ABSTRACT

A light emitting device adapted for a backlight module of a liquid crystal display is disclosed. The light emitting device comprises a plurality of light emitting units and a light guiding plate having a central portion and at least one side portion. Each of the light emitting units has a luminous surface and the light guiding plate has a plurality of light incident structures. Each of the light incident structures has a light incident surface opposite to the corresponding luminous surface, and a reflective surface forming an included angle with the light incident surface. Light emitted from each of the light emitting units passes through the light incident surface, is totally reflected by the reflective surface and enters into the central portion of the light guiding plate. The mixed reflective light run into the central portion of the light guiding plate and deflects outward to a user's side.

10 Claims, 6 Drawing Sheets

LIGHT EMITTING DEVICE HAVING REFLECTIVE SURFACES EXTENDED FROM LIGHT INCIDENT SURFACES

This application claims priority to Taiwan Patent Application No. 095103759 filed on Jan. 27, 2006.

CROSS-REFERENCES TO RELATED APPLICATIONS

Not Applicable.

BACKGROUND OF THE INVENTION

1. Field of the Invention

The present invention relates to a light emitting device, and more particularly, to a light emitting device for use in a backlight module of a liquid crystal display (LCD).

2. Descriptions of the Related Art

A liquid crystal display utilizes a liquid crystal panel to display. Since liquid crystal panels do not emit light by itself, it is necessary to equip them with light sources having enough brightness and uniform light. Through guiding the emitted light efficiently and adequately, liquid crystal panels can display images with high qualities. Providing quality light is through a backlight module.

In view of the positions of light sources relative to display panels, backlight modules are usually categorized into edge-type lighting modules and bottom-type lighting modules. There are many types of light sources as well, including Light Emitting Diode (LED). By adopting various light sources and providing them at different positions of the light guiding plate, people can create many different light emitting devices.

FIG. 1A and FIG. 1B illustrate a light emitting device of a blacklight module of the prior art. The light emitting device comprises a light guiding plate 12 and a set of light sources 13 (i.e. a plurality of LEDs). The light guiding plate 12 comprises a light incident surface 121 and a light outgoing surface 122, which is adjacent to and is approximately perpendicular to the light incident surface 121. The light outgoing surface 122 comprises an active display area. The set of light sources 13 faces the light incident surface 121, whose emitted light enters into the light guiding plate 12 through the light incident surface 121 and exits though the light outgoing surface 122 after certain reflections and refractions. However, light emitting angles of the set of light sources 13 (especially point light sources like LEDs) are usually between 90 to 110 degrees and makes regions of the active display area, where the light incident surface 121 is adjacent, form dark areas due to less incident light. The situation usually occurs at the regions of the corners of the panel and areas between point light sources. It degrades the degree of the uniformity of the light guiding plate 12.

A technique illustrated in FIG. 1C tries to reduce the aforementioned dark area by introducing a curved concaved area 123 to increase the scattering angle of the emitted light of the set of light sources 13. However, the improvement is still limited.

SUMMARY OF THE INVENTION

One object of the present invention is to solve the problem of the dark area at a light incident portion of a light guiding plate. By total reflection, in part or in entirety, at the side area of the light guiding plate, the emitted light to travel in the light guiding plate can be distributed evenly.

Another object of the present invention is to make the emitted light at the aforementioned side area of the light guiding plate travel in the manner of total reflection, in part or in entirety, so that the emitted light entering the central area (active display area) of the light guiding plate can be distributed uniformly and efficiently at the early stage. The effect is more outstanding when applying the light guiding plate to displays with larger sizes and narrower frames.

In order to achieve the aforementioned objects, a light emitting device according to the present invention is provided. An exemplary embodiment of a light emitting device comprises a plurality of light emitting units and a light guiding plate having a central portion and at least one side portion. The light guiding plate comprises a plurality of light incident structures. Each of the light incident structures includes a light incident surface facing the corresponding light emitting unit; and a reflective surface forming an angle with the light incident surface. When each of the light emitting units emits light, the emitted light passes through the light incident surface, is reflected by the reflective surface and is mixed uniformly. The mixed light enters into the central portion of the light guiding plate, and then exits.

The preferred embodiments implemented for the subject invention are described in the following paragraphs accompanying the appended drawings for people skilled in this field to well appreciate the features of the present invention.

DESCRIPTIONS OF THE PREFERRED EMBODIMENT

The description of the light source module and LEDs in the following paragraphs does not include the detailed structures and the operation principles because they are existing techniques. The existing art adopted in the present invention are referred to by their emphasis added for better understanding. Moreover, since figures of light emitting devices are used to express characteristics of the present invention, they are not drawn according to their physical proportions. Units and structures set forth for the embodiments of the present invention should not be limited by the descriptions. Any modification of numbers and combination/application between various embodiments should not be limited either, if expected results are achievable.

Figure 1A:
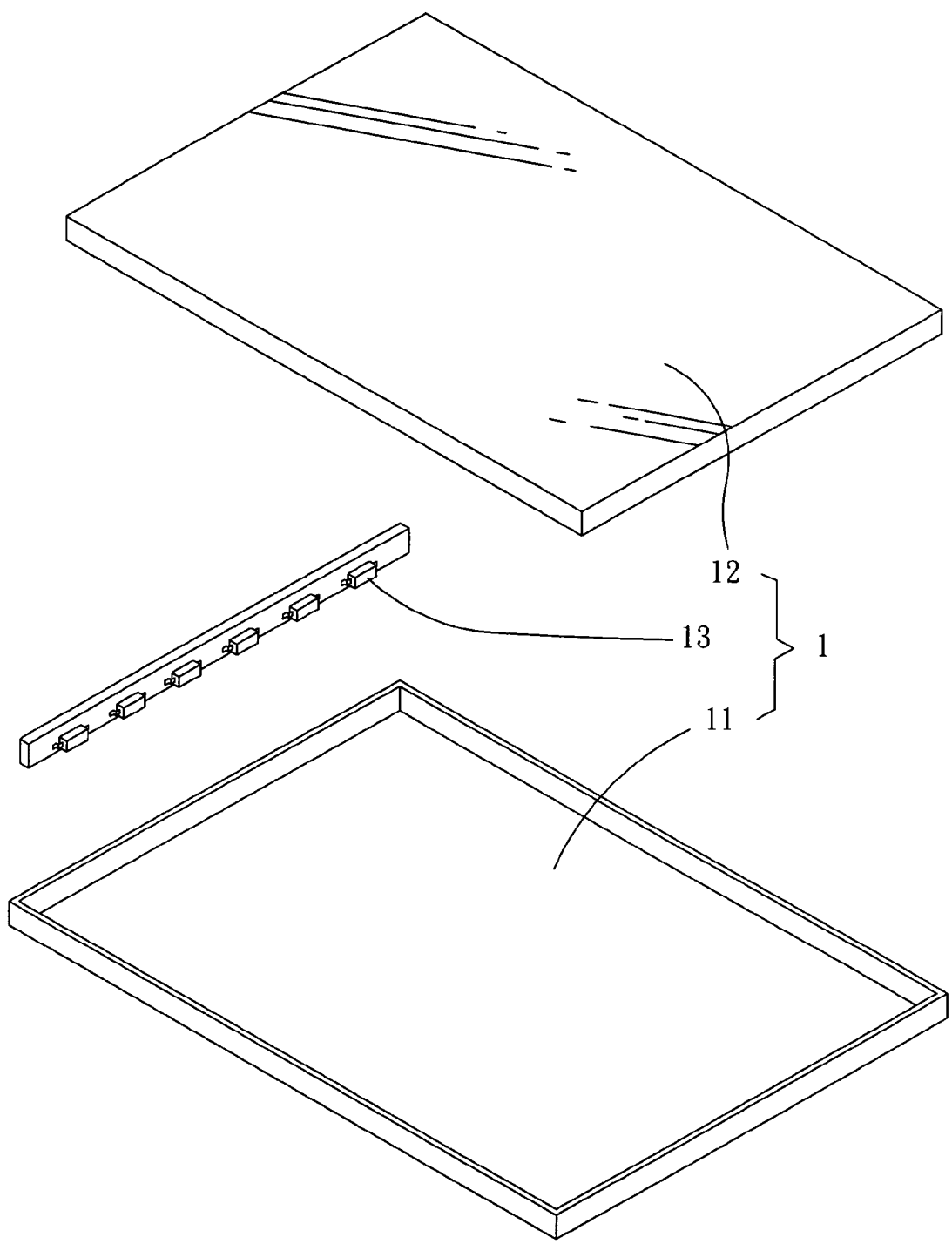
FIG. 1A is a schematic view showing a light emitting device with respect to a blacklight module of the prior art.

FIG. 1A illustrate a light emitting device adapted to a backlight module 1 of the prior art. The prior backlight module 1 (especially edge-type lighting module) comprises a frame 11, a light guiding plate 12, and a set of light sources 13. The light guiding plate 12 and the set of light sources 13 mutually define a so-called a light emitting device. The difference between the present invention and prior art is the light emitting device of a backlight module. Since other parts of the present invention can refer to the prior art, they are not detailed in the following descriptions.

Figure 2:
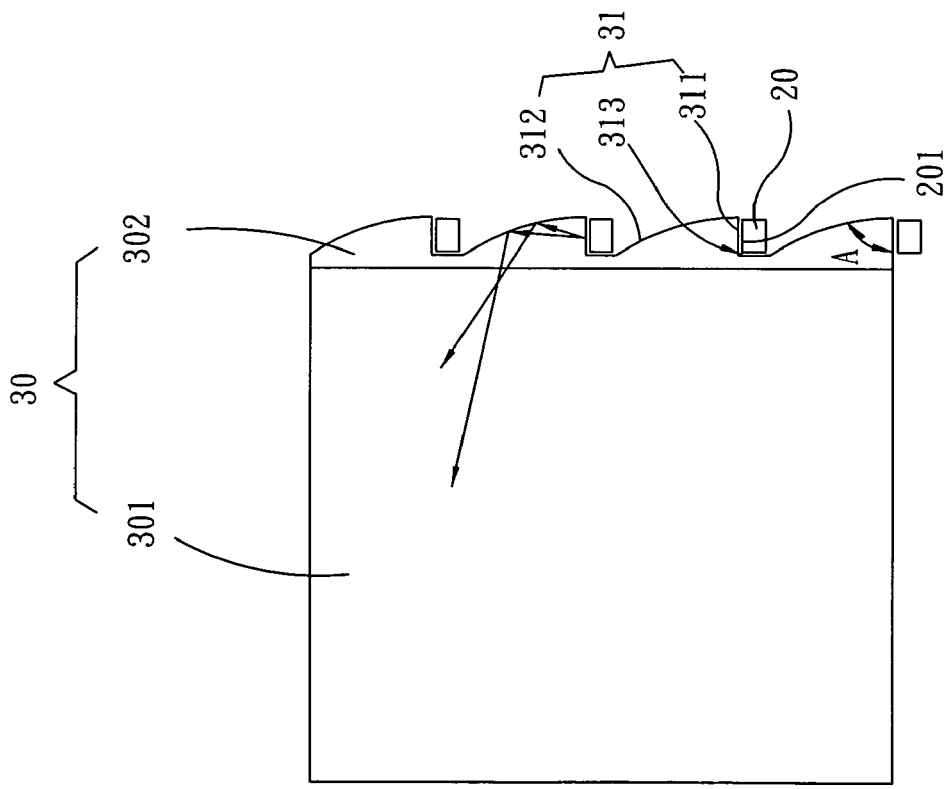
FIG. 2 is a schematic plan view showing a light emitting device according to the first embodiment of the present invention.

FIG. 2 schematically illustrates a first embodiment of a light emitting device of the present invention. The light emitting device of the present invention comprises a plurality of light emitting units 20 and a light guiding plate 30. Each of the light emitting units 20 has a luminous surface 201. The light guiding plate 30 has a central portion 301 and at least one side portion 302. The at least one side portion 302 comprises a plurality of light incident structures 31.

Each of the light incident structures 31 includes a light incident surface 311 facing the corresponding luminous surface 201; and a reflective surface 312 forming an angle A with the light incident surface 311. The angle A is less than about 90 degree. When the light emitting units 20 project light, the emitted light enters into the side portion 302 through the light incident surface 311, is reflected by the reflective surface 312, and then enters into the central portion 301 of the light guiding plate 30, and finally exits (to the viewer).

To achieve a better result, the at least one side portion 302 of the light guiding plate 30 is defined by the contiguous light incident structures 31. That is, the reflective surfaces 312 of the light incident structures 31 define part of the at least one side portion 302. In addition, each of the reflective surfaces 312 is a substantially nonlinear surface. In the figure of this embodiment, each of the reflective surfaces 312 is a substantially curved surface. Besides, the emitted light of the light emitting units 20 enters the side portion 302 through the light incident surface 311, and then is reflected by the reflective surfaces 312. To achieve a better result without degrading the utilization of light, the light reflection is partially or totally performed on the reflective surfaces 312 in a total reflection path according to the Snell's Law.

Still with reference to FIG. 2, preferably, each of the light incident structures 31 includes a recess 313 for receiving the corresponding light emitting unit 20. The recess 313 is defined by two adjacent side walls, one of which is preferably the light incident surface 311 of each of the light incident structures 31.

Figure 3:
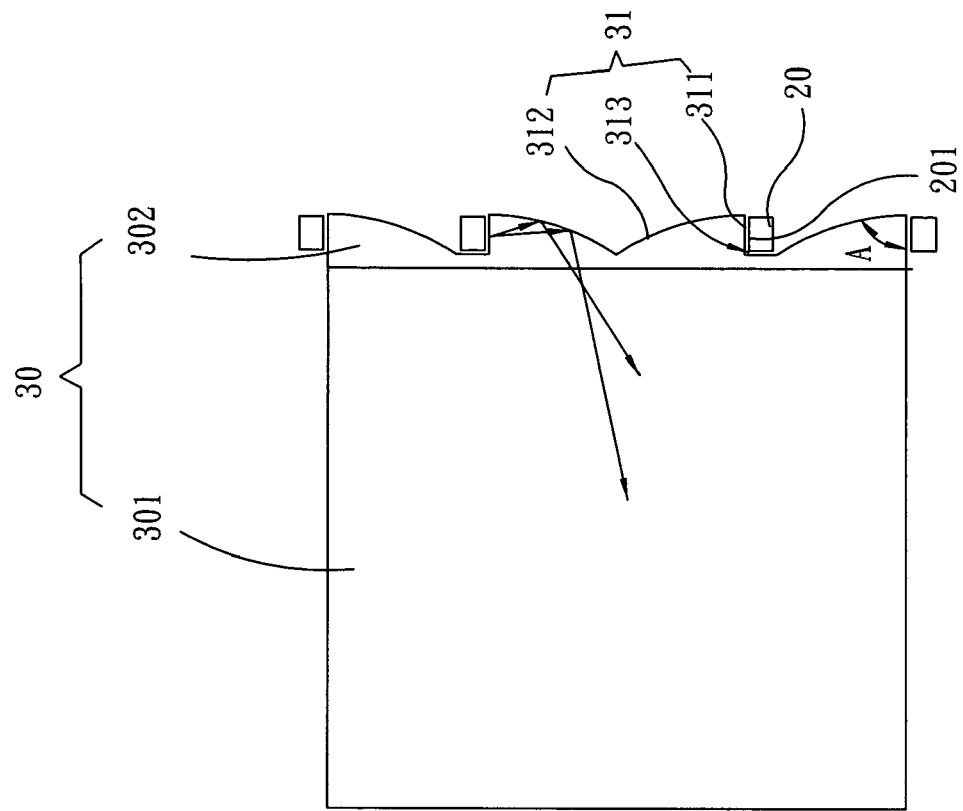
FIG. 3 is a schematic plan view showing a light emitting device according to the second embodiment of the present invention.

FIG. 3 schematically illustrates a second embodiment of a light emitting device of the present invention, wherein at least two of the reflective surfaces 312 are adjacent to each other. Each of the reflective surfaces 312 is a substantially nonlinear surface. More particularly, each of the reflective surfaces 312 is a substantially curved surface.

Figure 4B:
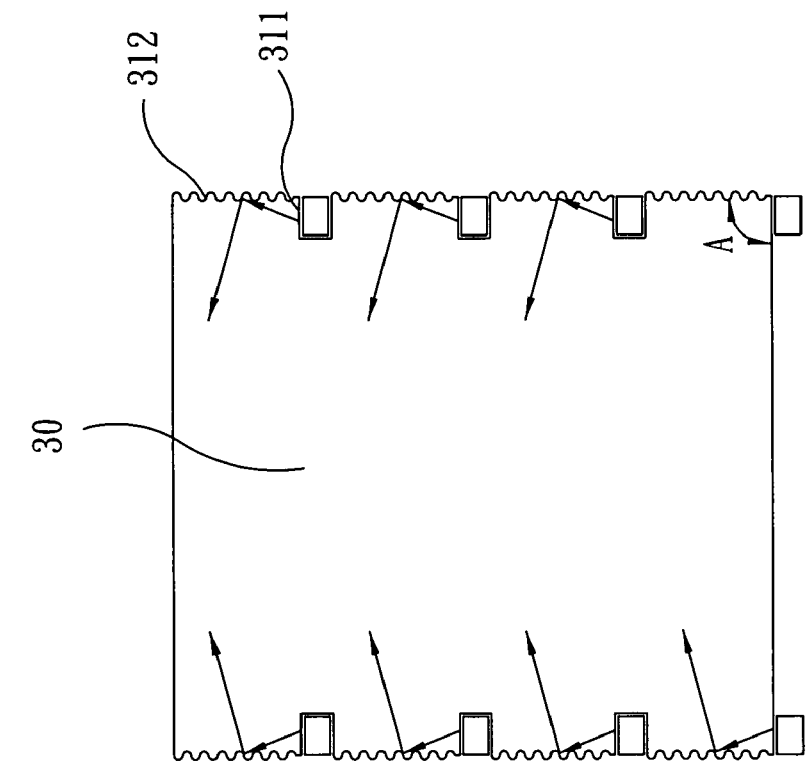
FIG. 4B is a schematic plan view showing the light incident structures disposed at two opposite sides of the light guiding plate according to the third embodiment of the present invention.
Figure 4A:
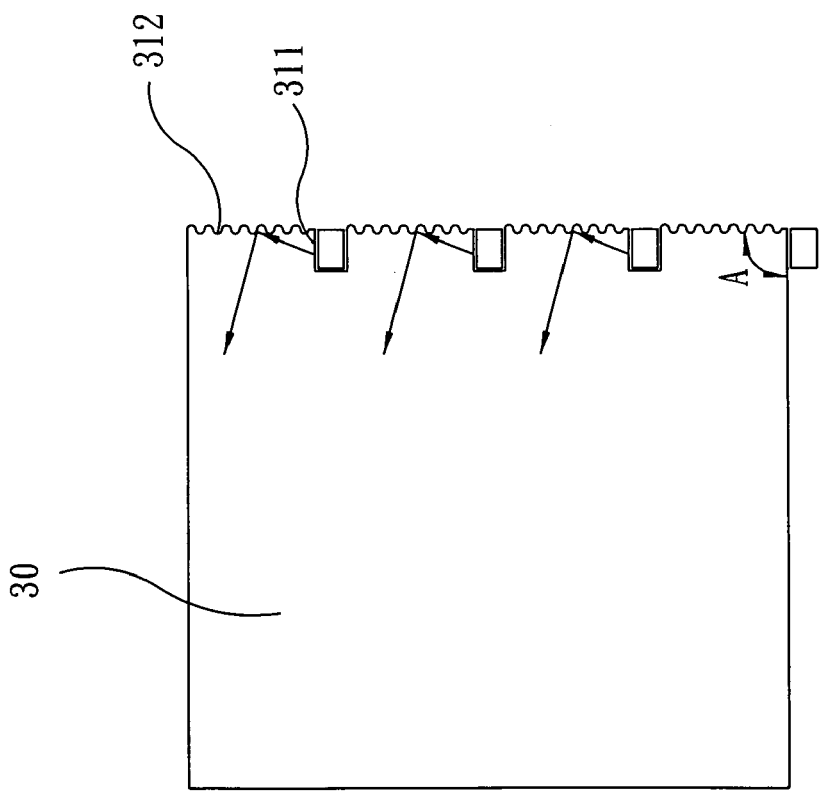
FIG. 4A is a schematic plan view showing a light emitting device according to the third embodiment of the present invention.

In order to avoid any confusion resulting from numerous symbols, elements with structures similar to the aforementioned embodiments are not denoted by distinctive reference numerals. FIG. 4A schematically illustrates a third embodiment of a light emitting device of the present invention, wherein each of the reflective surfaces 312 is a substantially continuous linear surface. In the figure, the reflective surface 312 is substantially a continuous irregular surface. In addition, the angle A between the reflective surface 312 and the light incident surface 311 is substantially 90 degree. FIG. 4B schematically illustrates the third embodiment which shows the light emitting device disposed at two opposite sides of the light guiding plate 30.

Figure 5:
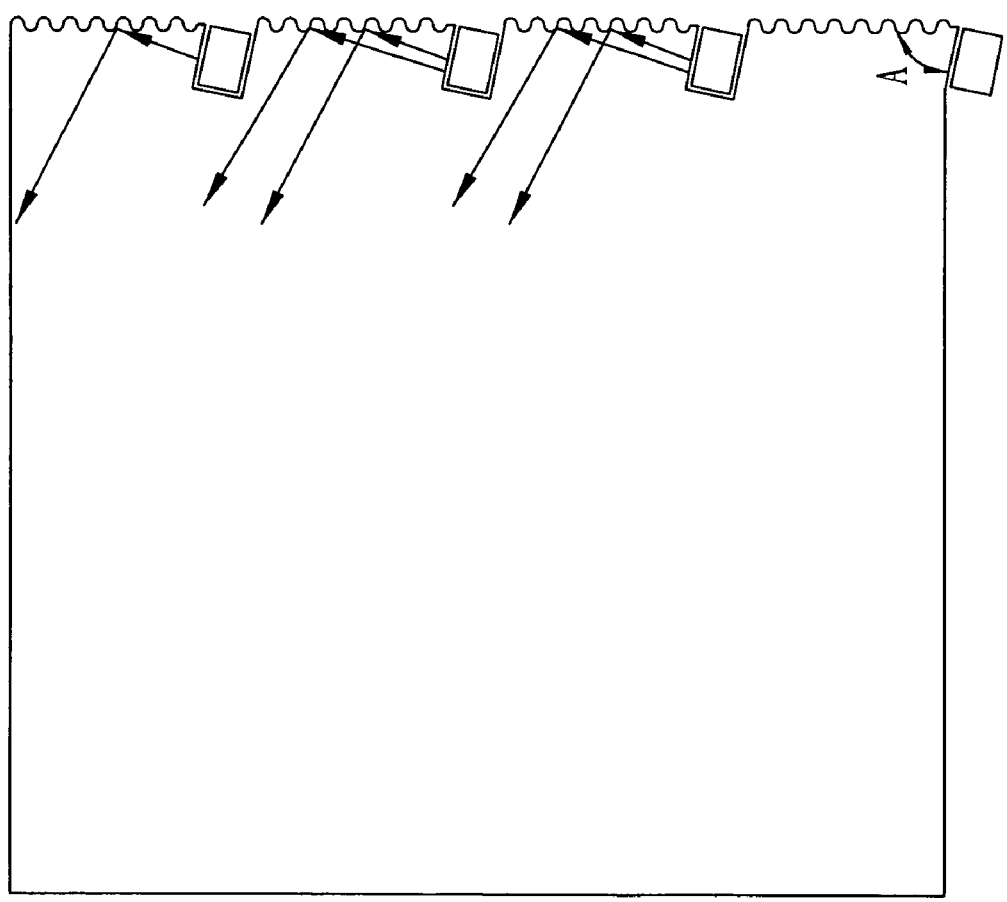
FIG. 5 is a schematic plan view showing a light emitting device according to the fourth embodiment the present invention.

FIG. 5 schematically illustrates a fourth embodiment of a light emitting device of the present invention. The structure generally resembles the third embodiment. The difference between these two embodiments resides in that the angle A between the reflective surface 312 and the light incident surface 311 is less than about 90 degree in this embodiment. More preferably, the angle A between the reflective surface 312 and the light incident surface 311 substantially ranges from 10 to 80 degree.

Figure 1B:
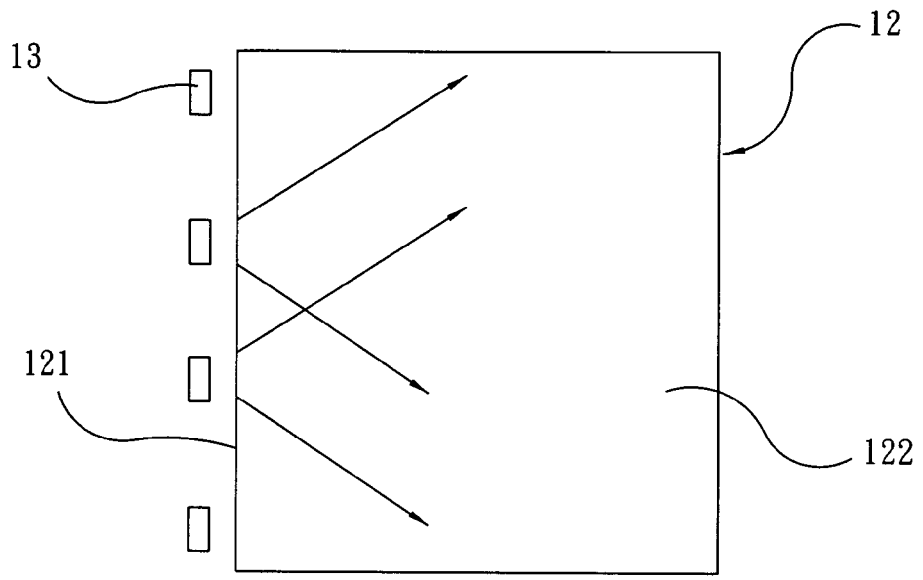
FIG. 1B is a schematic plan view showing the light emitting device in FIG. 1A.
Figure 1C:
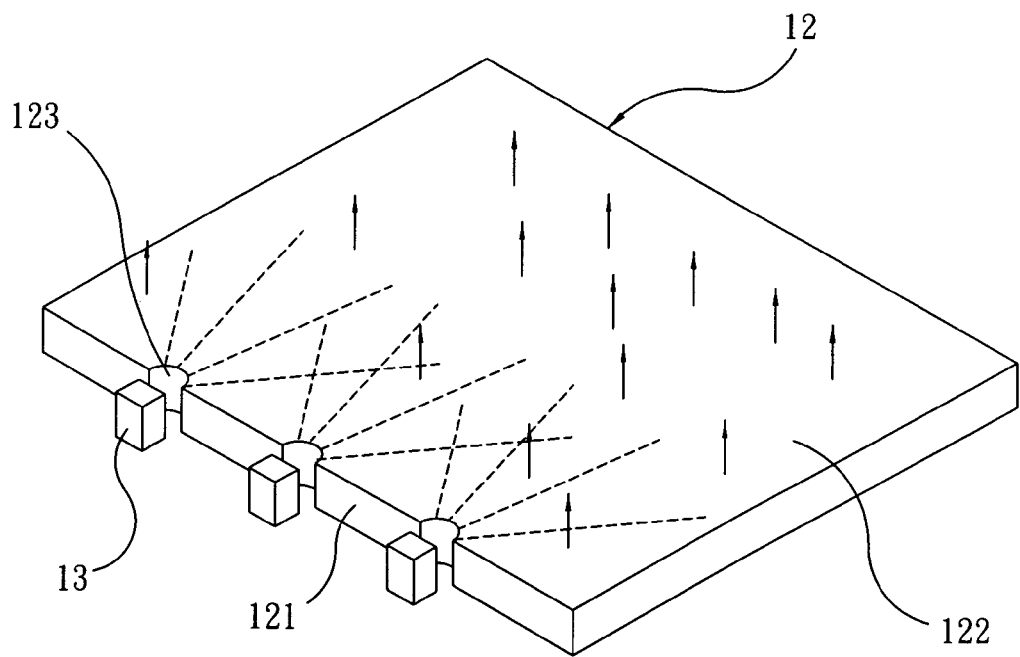
FIG. 1C is a schematic view showing an alternative embodiment of a light emitting device of the prior art.
Figure 6B:
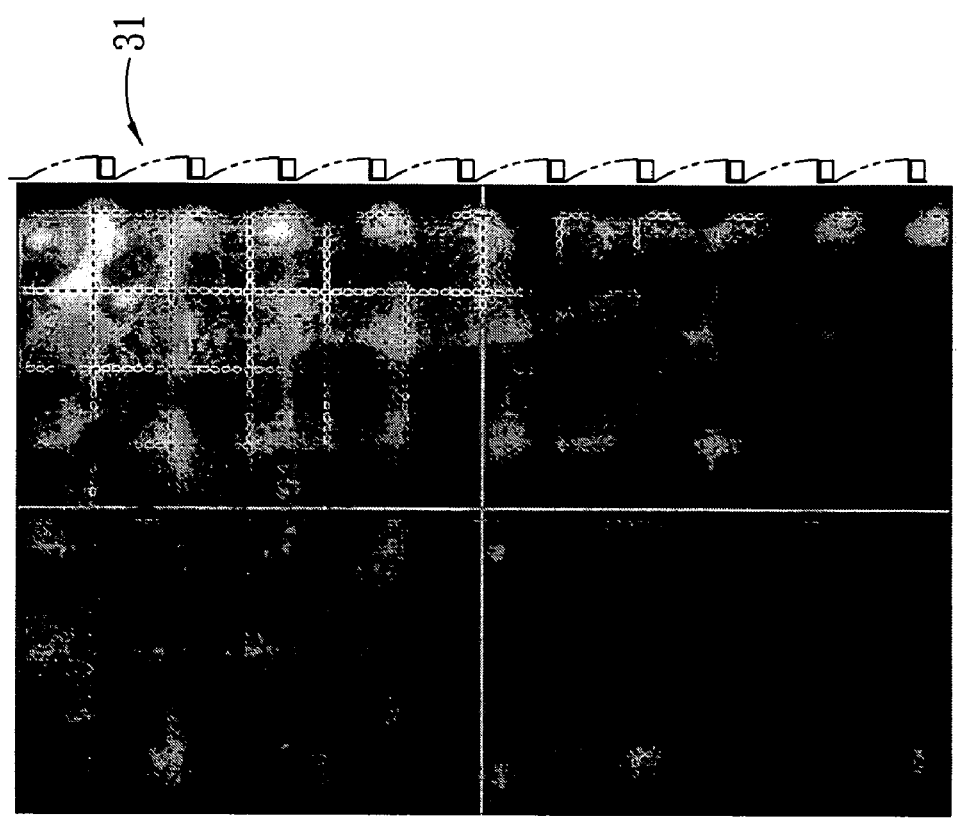
FIGS. 6A and 6B are diagrams showing the actual light simulation results over the light emitting devices in FIG. 1B and FIG. 2.
Figure 6A:
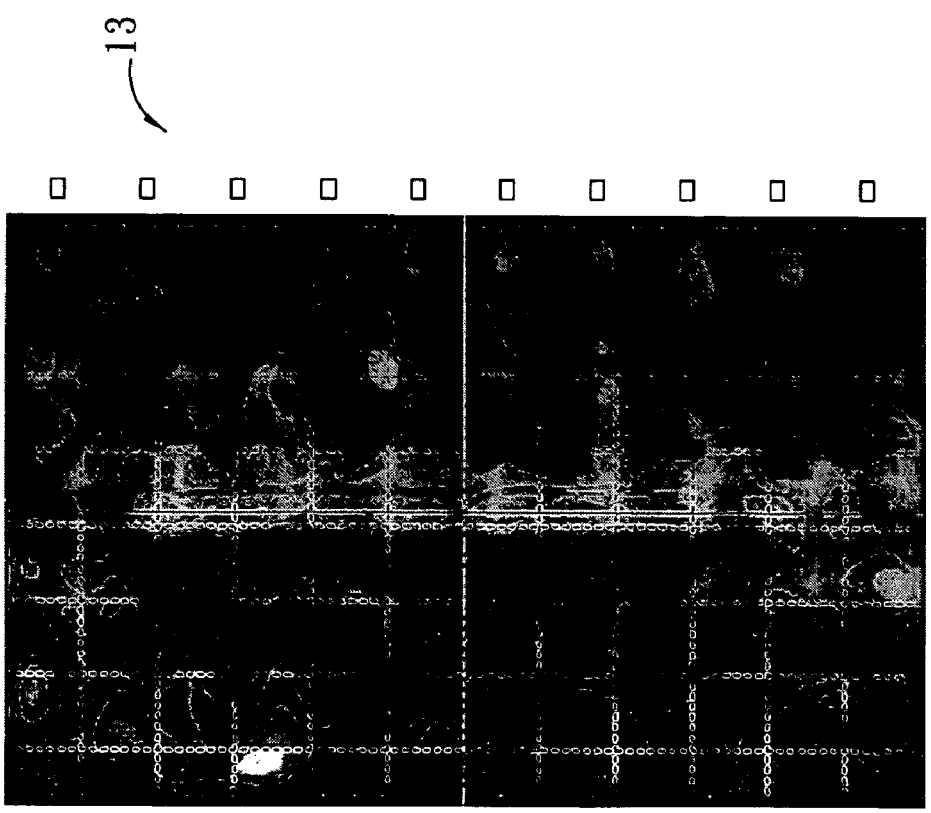

FIG. 6A and FIG. 6B schematically illustrate diagrams showing the light simulation results in view of the light emitting devices in FIG. 1B and FIG. 2, respectively. Specifically, FIG. 6A illustrates the results in the prior art that the light sources emit light directly into the light guiding plate 12. FIG. 6B illustrates the simulation result of the light emitting device of the present invention as shown in FIG. 2. From the simulation result, the variations of the brightness near the light incident surface 311 of the light emitting device are obviously improved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A light emitting device, comprising:
    a plurality of light emitting units; and
    a light guiding plate having a central portion and at least one side portion, the at least one side portion comprising a plurality of light incident structures, each of the light incident structures including:
        a light incident surface facing the corresponding light emitting unit;
        a reflective surface, being contiguously wave-shaped, being extended from, and in direct contact with, the light incident surface and forming a physical angle with the light incident surface; and
        a recess accommodating the corresponding light emitting unit, wherein the recess is defined by two opposite side walls, one of which is the light incident surface directly extended from, and in contact with, the reflective surface of the corresponding light incident structure, and the other of which is extended from the reflective surface of the adjacent light incident structure.

2. The light emitting device of claim 1, wherein each of the light emitting units has a luminous surface, facing the corresponding light incident surface.

3. The light emitting device of claim 1, wherein the at least one side portion of the light guiding plate is defined by the contiguous light incident structures, whereby the plurality of reflective surfaces define part of the at least one side portion.

4. The light emitting device of claim 1, wherein at least two of the reflective surfaces are adjacent to each other.

5. The light emitting device of claim 4, wherein the recess is further defined by another side wall which connects the two opposite side walls.

6. The light emitting device of claim 1, wherein light emitted from each of the plurality of light emitting units passes through the light incident surface, is totally reflected by the reflective surface, and enters into the central portion of the light guiding plate.

7. The light emitting device of claim 1, wherein the recess is further defined by another side wall, which connects the two opposite side walls.

8. The light emitting device of claim 7, wherein the physical angle between the reflective surface and the light incident surface is less than about 90 degree.

9. The light emitting device of claim 7, wherein the physical angle between the reflective surface and the light incident surface is substantially 90 degree.

10. The light emitting device of claim 7, wherein the physical angle between the reflective surface and the light incident surface substantially ranges from 10 to 80 degree.

* * * * *